(12) United States Patent
Mankame et al.

(10) Patent No.: US 9,334,905 B2
(45) Date of Patent: May 10, 2016

(54) HYBRID CODED MAGNETS AND SMA POSITIVE DRIVE CLUTCH

(75) Inventors: Nilesh D. Mankame, Ann Arbor, MI (US); Shivaram Ac, Bangalore (IN); John C. Ulicny, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 13/447,922

(22) Filed: Apr. 16, 2012

(65) Prior Publication Data

US 2013/0270056 A1    Oct. 17, 2013

(51) Int. Cl.
| | |
|---|---|
| *F16D 23/02* | (2006.01) |
| *F16D 37/00* | (2006.01) |
| *F16D 23/12* | (2006.01) |
| *F16D 27/01* | (2006.01) |
| *H02K 49/10* | (2006.01) |
| *H02K 21/02* | (2006.01) |

(52) U.S. Cl.
CPC .............. *F16D 23/02* (2013.01); *F16D 23/12* (2013.01); *F16D 27/01* (2013.01); *H02K 49/104* (2013.01); *F16D 37/008* (2013.01); *H02K 21/027* (2013.01); *H02K 2213/09* (2013.01)

(58) Field of Classification Search
CPC ....... F16D 23/12; F16D 27/004; F16D 27/01; F16D 37/008; H02K 49/104; H02K 21/027
USPC .......... 192/21.5, 52.4, 52.5, 53.2, 58.43, 66.2
See application file for complete search history.

(56) References Cited

U.S. PATENT DOCUMENTS

| | | | | |
|---|---|---|---|---|
| 3,713,519 | A * | 1/1973 | Ruget | 192/53.2 |
| 4,896,754 | A * | 1/1990 | Carlson et al. | 192/21.5 |
| 5,722,510 | A * | 3/1998 | Viale | 185/40 R |
| 5,823,309 | A * | 10/1998 | Gopalswamy | F16D 37/02 192/113.31 |
| 5,848,678 | A * | 12/1998 | Johnston et al. | 192/21.5 |
| 8,127,907 | B1 * | 3/2012 | White et al. | 192/21.5 |
| 8,547,191 | B2 * | 10/2013 | Boutillon et al. | 335/219 |
| 2009/0033448 | A1 * | 2/2009 | Hoang et al. | 335/215 |
| 2013/0002057 | A1 * | 1/2013 | Laufenberg et al. | 310/26 |

* cited by examiner

*Primary Examiner* — Robert Hodge
*Assistant Examiner* — Stacey Fluhart
(74) *Attorney, Agent, or Firm* — Mark S. Cohen; Pearl Cohen Zedek Latzer Baratz LLP

(57) ABSTRACT

A clutch for selective transmission of torque and power, utilizing pairs of coded arrays of permanent magnets affixed respectively to the driving member and the driven member. A shape memory alloy actuator brings to driving member and the driven member into proximity to engage the clutch via a higher-order mutual magnetic correspondence between the coded magnetic regions of the permanent magnet arrays. Also provided is a clutch having a magnetorheological fluid between the driving member and the driven member, to increase the torque and power transfer through the fluid when its viscosity is increased by the magnetic field of the arrays in proximity. Sets of corresponding teeth on the driving member and driven member mesh when the rotation of the members is synchronized, providing positive direct drive to prolong the service life of the fluid.

2 Claims, 2 Drawing Sheets

HYBRID CODED MAGNETS AND SMA POSITIVE DRIVE CLUTCH

BACKGROUND

Direct current (DC) motor drives in conjunction with Shape Memory Alloy (SMA) actuators are being explored for a wide range of automotive and similar applications ranging from power seats to power sunroofs to power shutters. These drives combine the best attributes of DC motors (low cost, high continuous power output, reversible motion) and SMA actuators (low mass, extremely small package size, high energy density) to allow a single DC motor to be multiplexed across multiple applications thereby yielding compact and low cost alternatives to the current practice of driving each application with a dedicated DC motor. SMA actuators serve to engage/disengage clutches that control the flow of torque and power from the DC motor to various loads. Smooth engagement requires the driving and driven members of the clutch to align properly and attain the same speed before engagement. Typically, friction cone extensions of the mating clutch elements or software based techniques are used to achieve this. Unfortunately, friction cone extensions do not perform well at small length scales, and software solutions introduce an undesirable time lag in clutch response.

To overcome the above drawbacks, magnetorheological fluids ("MRF") have been proposed for use in a clutch. An MRF has a viscosity which can be controlled by applying a magnetic field. In the absence of a magnetic field, an MRF has a low viscosity. When a magnetic field is applied, the MRF viscosity increases substantially and can transmit torque and power through the viscous fluid.

Unfortunately, however, MRFs tend to exhibit long-term degradation when subjected to high shear stress in the viscous state.

There is thus a need for a clutch that either benefits from the controllable viscosity of the MRF while minimizing the stress on the MRF, or which is able to avoid the need for the MRF altogether. This goal is met as disclosed herein.

SUMMARY

The present application discloses a clutch for selective transmission of torque and power, examples of which utilize pairs of coded arrays of permanent magnets affixed respectively to the driving member and the driven member. Benefits include smooth engagement and disengagement, long life, reduced noise, suitability for small-scale clutches, and better response times than attainable through software solutions.

Coded magnetic arrays feature a magnetic field that is strong at close range ("near field"), but which falls off rapidly with increasing distance. A coded magnetic array may also be custom-configured with a special coded pattern of magnetic regions to have a particularly strong magnetic interaction when brought into magnetic proximity with another array that has been custom-configured to correspond to the same pattern. The strong magnetic interaction not only can attract the coded arrays toward one another, but can also align them to particular positions and angles, according to the specific pattern. Such corresponding patterns are denoted herein as having a "higher-order mutual magnetic correspondence", a term which indicates that the magnetic field is of higher multipole order than an ordinary magnetic dipole field.

According to examples in the present disclosure, when the coded magnetic arrays of the driving member and of the driven member are separated by a variable distance, and when the variable distance is reduced, the coded magnetic arrays are brought into magnetic proximity with each other, at which point their magnetic near-field interaction synchronizes the rotation of the driven member with that of the driving member.

According to other examples of the present invention, an MRF is disposed between the driving member and the driven member to enhance the effect of the coded magnetic arrays, for synchronizing the rotation of the driven member with that of the driving member. The MRF brings the driven member up to speed, after which the coded magnets align the angular position of the driven member relative to the driving member.

In further examples of the present invention, the driving member and the driven member have teeth which can be meshed to achieve positive locking of the members after synchronization. In the case of examples utilizing an MRF, shear stress on the MRF immediately vanishes when the teeth mesh, thereby minimizing deterioration of the MRF and prolonging the useful service life thereof.

In further examples, engaging and disengaging the clutch are performed mechanically by a Shape Memory Alloy (SMA) component, which changes shape when activated, to move the driving member and the driven member together or apart during clutch engagement and disengagement, respectively.

BRIEF DESCRIPTION OF THE DRAWINGS

The subject matter disclosed may best be understood by reference to the following detailed description when read with the accompanying drawings in which.

Figure 1A:
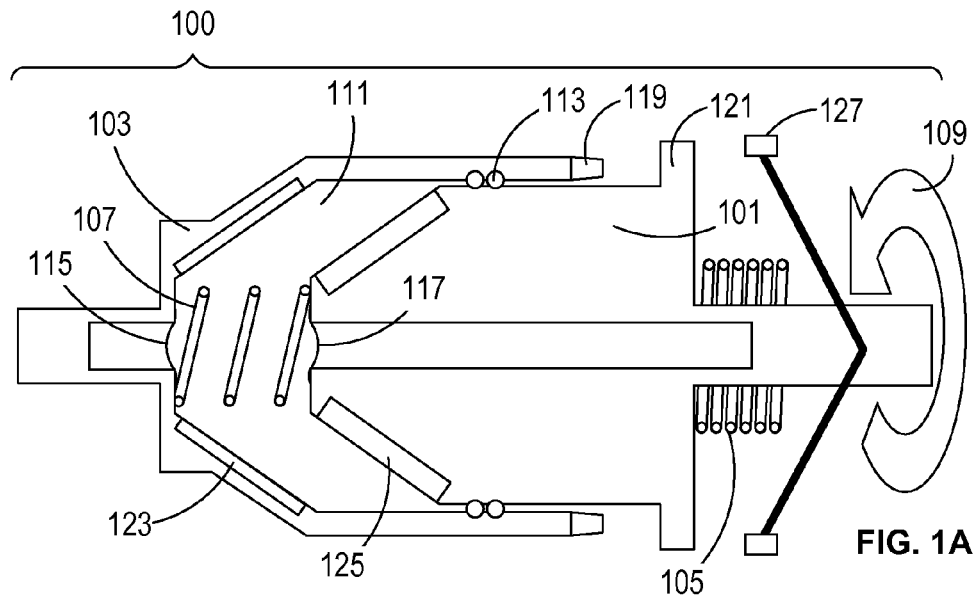
FIG. 1A illustrates a disengaged clutch according to an example of the present invention.

For simplicity and clarity of illustration, elements shown in the figures are not necessarily drawn to scale, and the dimensions of some elements may be exaggerated relative to other elements. In addition, because the figures are intended to be conceptual in nature for illustrative purposes, elements shown therein may not correspond exactly in shape, appearance, or layout to corresponding components intended for production or actual operation. Reference numerals may be repeated among the figures to indicate related or analogous elements.

DETAILED DESCRIPTION

FIG. 1A illustrates an example of a clutch 100 as presently disclosed, in a disengaged ("idle") state, where a rotation 109 of a driving member 101 is not transmitted to a driven member 103. An engagement bias spring 105 is opposed by a disengagement bias spring 107 which in the idle state causes a complete disengagement between driving member 101 and driven member 103. Mechanically, driving member 101 and driven member 103 can move closer together or further apart along the longitudinal axis of clutch 100 within a predetermined range. The distance between them is thus variable between an upper limit and a lower limit, which are typically provided via mechanical constraints on the relative linear displacement between driving member 101 and driven member 103.

A set of teeth 119 on driven member 103 meshes with a corresponding set of teeth 121 on driving member 101 when the variable distance is at the lower limit. When teeth 119 and teeth 121 are meshed, driven member 103 is locked rotationally to driving member 101. In such a configuration, clutch 100 operates in a frictionless manner as a direct mechanical coupling device. However, in the disengaged state shown in FIG. 1A, teeth 119 and teeth 121 are not meshed. Some residual torque coupling typically exists between driving member 101 and driven member 103 on account of friction from spring 107. Additionally, in examples utilizing MRF there is also friction from seal 113 and viscous shear from the MRF. However, teeth 119 and 121 are not able to smoothly mesh because driven member 103 and driving member 101 are not yet fully synchronized.

A coded array of magnetic regions 123 is affixed to driven member 103, and a coded array of magnetic regions 125 is affixed to driving member 101.

In some examples described in the present disclosure, a cavity 111 is filled with a magnetorheological fluid (MRF), which is retained in cavity 111 by a seal 113, an elastic membrane diaphragm 115, and an elastic membrane diaphragm 117. In the disengaged ("idle") state illustrated in FIG. 1A there is no magnetic coupling between driving member 101 and driven member 103, even when an MRF is used, because the far-field magnetic intensity of coded arrays 123 and 125 is very low on account of the relatively large distance between driving member 101 and driven member 103 when clutch 100 is disengaged as shown in FIG. 1A.

Cavity 111 has an axial dimension corresponding to the variable distance between driving member 101 and driven member 103.

An actuator 127 is shown in a non-activated state in FIG. 1A. When activated, actuator 127 engages clutch 100, as detailed in the following paragraphs. In examples of the present invention, actuator 127 includes a shape memory alloy (SMA) component. In certain examples, the SMA of actuator 127 is activated and deactivated thermally. In other examples, the SMA is a ferromagnetic shape memory alloy (FSMA), which is activated and deactivated magnetically.

Figure 1B:
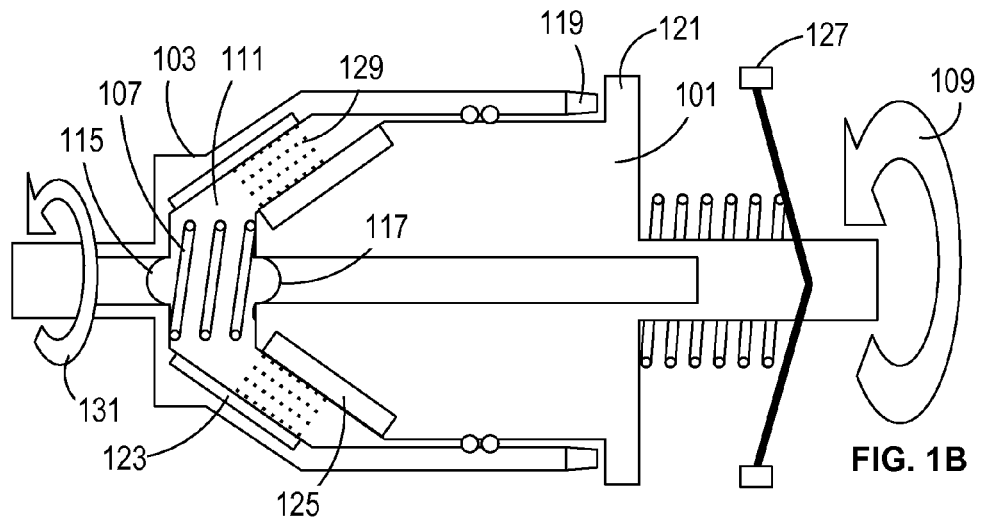
FIG. 1B illustrates a partially-engaged clutch according to the example of FIG. 1A.

FIG. 1B illustrates clutch 100 of FIG. 1A, when actuator 127 is partially activated at a fraction (e.g., 70% to 80%) of full stroke, during the beginning of a clutch engagement action. Actuator 127 partially overcomes disengagement bias spring 107 to bring coded arrays 123 and 125 sufficiently close together to be in partial magnetic proximity with each other, thereby exerting a torque on driven member 103 via the higher-order mutual magnetic correspondence of coded arrays 123 and 125.

In examples of the present invention which feature MRF in cavity 111, the mutual magnetic correspondence of coded arrays 123 and 125 causes formation of fibrils 129 in the MRF, and the consequent shear of the MRF results in increased transmission of torque and power from driving member 101 to driven member 103 through the MRF. Elastic membrane diaphragm 115 and elastic membrane diaphragm 117 are distended to serve as a reservoir to contain the volume of MRF displaced from cavity 111 by the decrease in distance between driving member 101 and driven member 103 by the transfer of the MRF into and out of cavity 111 as the distance between driving member 101 and driven member 103 changes.

At this stage of partial engagement, a rotation 131 of driven member 103 is not yet synchronized with rotation 109 of driving member 101, and teeth 119 are not yet meshed with teeth 121.

Figure 1C:
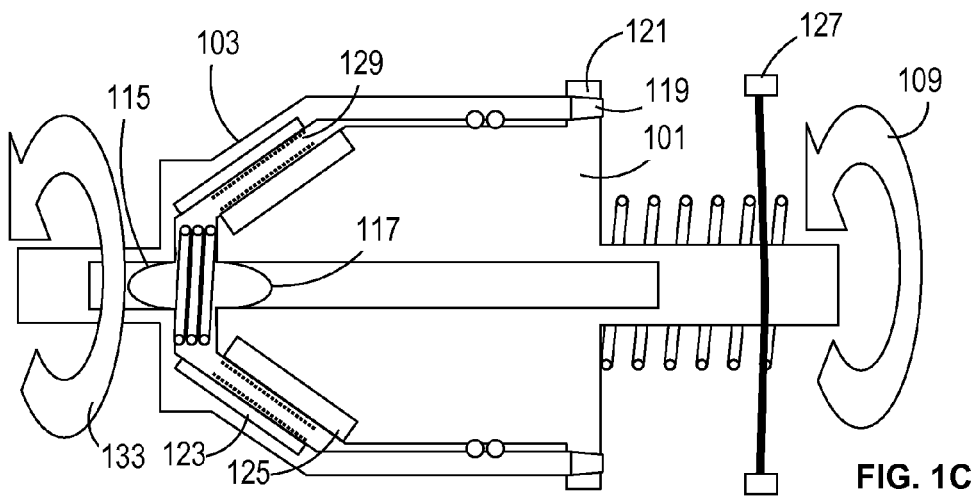
FIG. 1C illustrates a fully engaged clutch according to the example of FIG. 1A and FIG. 1B.

FIG. 1C illustrates clutch 100 of FIG. 1A, when actuator 127 is completely activated at full stroke, at the conclusion of the clutch engagement action. Actuator 127 fully overcomes disengagement bias spring 107 to bring coded arrays 123 and 125 close together in full magnetic proximity with each other, thereby aligning driven member 103 with driving member 101 via the higher-order mutual magnetic correspondence of coded arrays 123 and 125.

In examples of the present invention which feature MRF in cavity 111, the mutual magnetic correspondence of coded arrays 123 and 125 increases the formation of fibrils 129. Elastic diaphragm 115 and elastic diaphragm 117 are further distended to contain the volume of MRF displaced from cavity 111 by the further decrease in distance between driving member 101 and driven member 103.

At this stage of full engagement, a rotation 133 of driven member 103 is completely synchronized with rotation 109 of driving member 101, and teeth 119 mesh with teeth 121. Once this occurs, driving member 101 and driven member 103 are rotationally locked, so that clutch 100 is in a positive drive mode.

During the positive drive mode in examples of the present invention which feature MRF in cavity 111, no more torque is transferred through shear of the MRF. Thus, transfer of torque and power does not depend on the characteristics of the MRF, and the useful life thereof is extended.

Figure 2A:
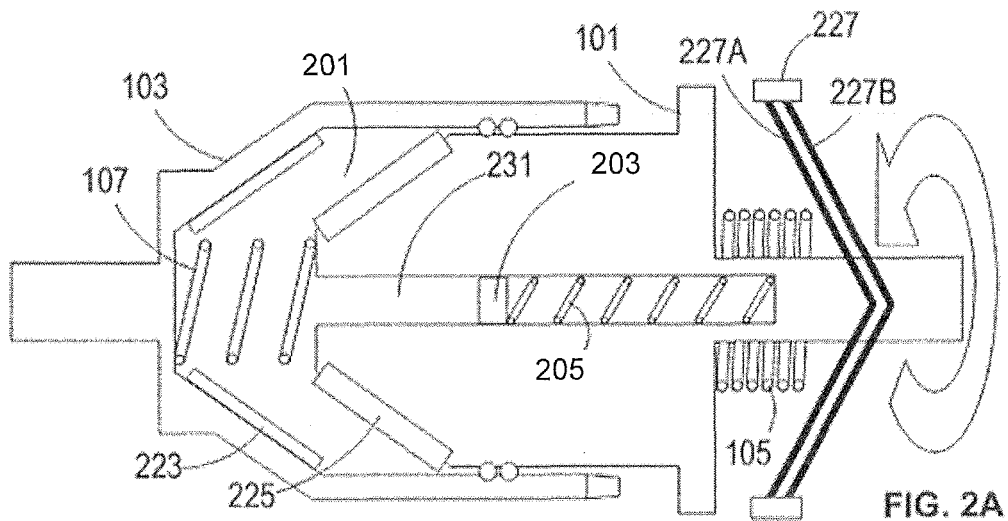
FIG. 2A illustrates a disengaged clutch according to another example of the present invention.
Figure 2B:
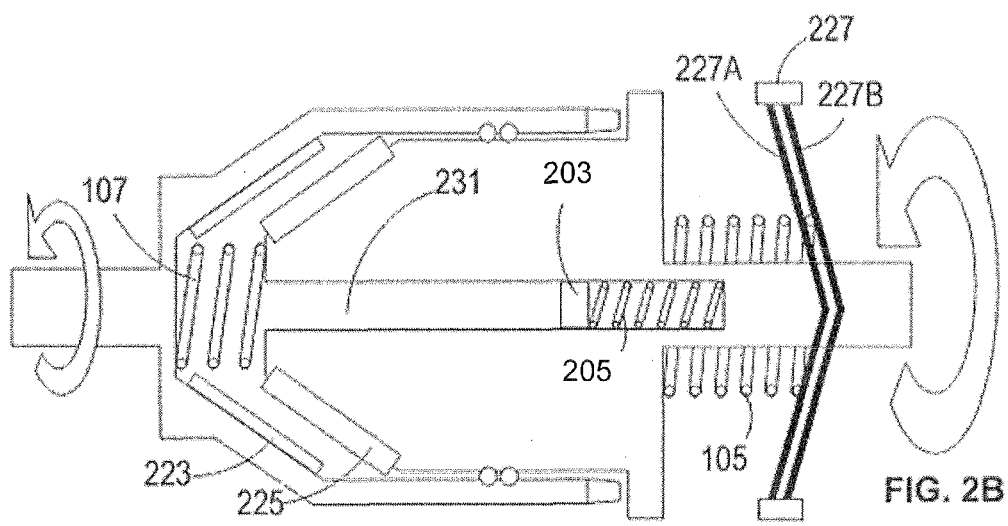
FIG. 2B illustrates a partially-engaged clutch according to the example of FIG. 2A.
Figure 2C:
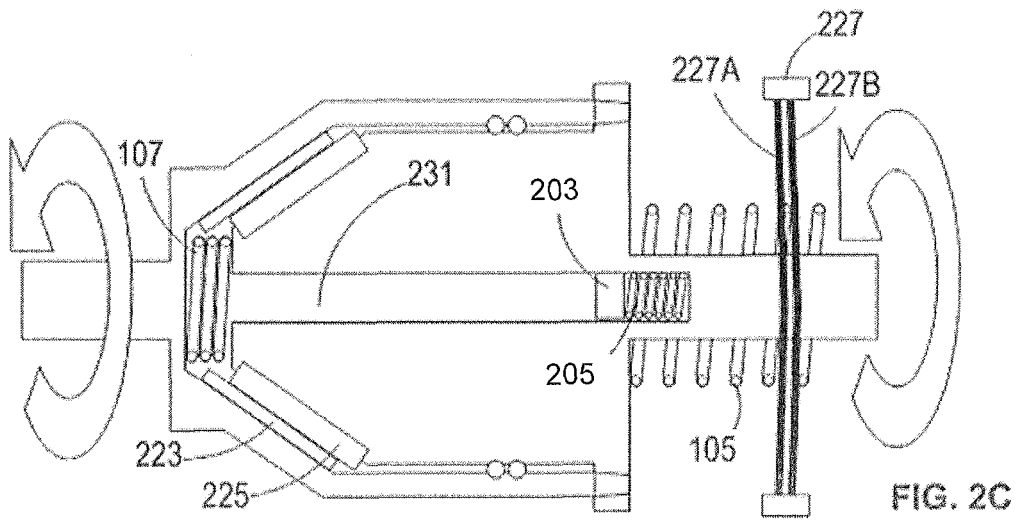
FIG. 2C illustrates a fully engaged clutch according to the example of FIG. 2A and FIG. 2B.

FIG. 2A illustrates an example of a clutch 100 as alternately disclosed, with features similar to those of FIG. 1A, except that a reservoir 201 with a freely-moveable ("floating") piston 203 having a return spring 205 is used to receive MRF displaced from cavity 111 as clutch 100 is engaged. FIG. 2B illustrates the position of piston 203 during the beginning of the clutch engagement action, and FIG. 2C illustrates the position of piston 203 when clutch 100 is fully engaged.

It is noted that the distinction between the member which is considered the "driving member" and the member which is considered the "driven member" depends on the direction of torque and power transfer. Certain embodiments of the present invention are symmetrical, in that either member 101 or member 103 may be considered to be the "driving member" depending on the circumstances of use. During service, clutch 100 (FIG. 1A) may alternately transfer torque and power in different directions at different times. Thus, it is understood that the terms "driving member" and "driven member" are not fixed to specific elements of the clutch, but are applied to the relevant elements of the clutch according to the circumstances as appropriate.

It is further noted that embodiments of the present invention also provide for symmetrical rotation of clutch 100 (FIG. 1A), in that both clockwise and counterclockwise rotation modes for the driving and driven members are provided. In certain embodiments of the present invention, the speed and/or direction of rotation may be changed at any time, when clutch 100 is disengaged (idle), when partially engaged (startup), or when fully engaged (normal operation).

When disengaging clutch 100 (FIG. 1A), the sequence of actions presented in FIG. 1A, FIG. 1B, and FIG. 1C is reversed by deactivating actuator 127, resulting in a smooth disengagement.

It is sometimes desirable to be able to keep clutch 100 in either a disengaged condition or an engaged condition without having to continually expend energy to maintain the disengaged/engaged condition. As described above and illustrated in FIG. 1A, if actuator 127 is not activated, clutch 100 remains in a disengaged "Power-Off hold" condition without continual expenditure of energy, because disengagement spring 107 is able to overcome both engagement spring 105 as well as the far-field magnetic forces between coded arrays 123 and 125. In an additional embodiment of the present invention, as illustrated in FIG. 2A, FIG. 2B, and FIG. 2C, a "Power-On hold" is also provided, in which the clutch remains engaged without having to continually expend energy keeping an actuator 227 activated after a clutch engagement operation.

In this embodiment, actuator 227 is configured to operate in a bidirectional fashion, such as by having two opposing elements 227A and 227B which can be independently activated. Thus, an engagement element 127A is activated to engage the clutch, and a disengagement element 127B is activated to disengage the clutch. As before, without activating actuator 227 the clutch, when disengaged, remains disengaged, because disengagement spring 107 overcomes engagement spring 105.

Unlike the previous embodiment illustrated in FIG. 1A, FIG. 1B, and FIG. 1C, however, in this embodiment coded magnetic arrays 223 and 225 are configured to hold together with the strong near-field attractive force, so that when the clutch is engaged (FIG. 2C), engagement element 227A can be deactivated without losing clutch engagement. Engagement spring 105 in combination with the near-field attractive force of coded magnetic arrays 223 and 225 sustains the engagement of the clutch even when engagement element 227A is no longer activated. Thus, the clutch has a "Power-On hold" which keeps the clutch engaged without requiring a continual expenditure of energy to maintain the engagement. To disengage the clutch, disengagement element 227B is activated. Disengagement spring 107 in combination with disengagement element 227B then overcomes engagement spring 105 in combination with the near-field attractive force of coded magnetic arrays 223 and 225 to disengage the clutch, and return to the state shown in FIG. 2A. In embodiments of the present invention, elements 227A and 227B are SMA elements.

What is claimed is:

1. A hybrid clutch comprising:
a driving member having a first coded magnetic array;
a driven member engaged by the driving member through magnetorheological fluid (MRF), the driven member having a second magnetic array,
wherein the first and the second magnetic arrays are configured to form a magnetic coupling such that teeth of the driven member are aligned with inter-tooth spaces of the driving member prior to meshing of the driven member and driving member; and
a variable capacity holding reservoir for MRF fluid, the holding reservoir having an elastic membrane configured to expand bi-directionally in accordance with proximity between the driven member and the driving member.

2. A hybrid clutch comprising:
a driving member having a first coded magnetic array;
a driven member engaged by the driving member through magnetorheological fluid (MRF), the driven member having a second magnetic array,
wherein the first and the second magnetic arrays are configured to form a magnetic coupling such that teeth of the driven member are aligned with inter-tooth spaces of the driving member prior to meshing of the driven member and driving member; and
a variable capacity holding reservoir for MRF fluid, the holding reservoir having a wall implemented as a spring-biased piston configured to retract in accordance with proximity between the driven member and the driving member.

* * * * *